United States Patent [19]

Yie

[11] Patent Number: 5,117,872
[45] Date of Patent: Jun. 2, 1992

[54] HIGH-PRESSURE FLUID CONTROL VALVE

[75] Inventor: Gene G. Yie, Auburn, Wash.

[73] Assignee: Fluidyne Corporation, Auburn, Wash.

[21] Appl. No.: 701,534

[22] Filed: May 16, 1991

[51] Int. Cl.⁵ .................. F16K 31/38; F16K 31/60
[52] U.S. Cl. ........................................ 137/882; 251/44
[58] Field of Search ............... 137/882, 115; 251/38, 251/44

[56]  References Cited

U.S. PATENT DOCUMENTS

| | | | |
|---|---|---|---|
| 3,394,890 | 7/1968 | Heinrich et al. | 251/38 X |
| 3,788,347 | 1/1974 | Guth | 137/882 X |
| 3,986,523 | 10/1976 | Pacht | 137/882 |
| 4,024,884 | 5/1977 | Prescott et al. | 251/44 X |
| 4,095,774 | 6/1978 | Garnett et al. | 251/44 |
| 4,406,383 | 9/1983 | Duncan | 251/44 X |
| 4,699,351 | 10/1987 | Wells | 251/44 X |

Primary Examiner—Stephen M. Hepperle
Attorney, Agent, or Firm—Speckman & Pauley

[57]  ABSTRACT

A valve assembly having a valve body, a middle body and an adapter block secured to each other. Fluid enters thorough an inlet tube and in a normal operating condition is discharged through an outlet tube. To relieve the pressure within the valve assembly, a dump tube is opened. A dump valve seat is mounted within the valve body. A valve plunger is mounted within a plunger shoulder cavity within the valve body and/or the middle body. The valve plunger mates with the dump valve seat. A compression spring is used to urge the valve plunger into either a seated position or an unseated position. A dump valve stem is axially displaced into and out of a seated position within a plunger through hole of the valve plunger.

13 Claims, 9 Drawing Sheets

HIGH-PRESSURE FLUID CONTROL VALVE

BACKGROUND OF THE INVENTION

1. Field of the Invention

This invention relates to different embodiments of fluid control valves that are suitable for operating with human hand or foot forces, when the fluid pressure is extremely high, but are also suitable for operating with mechanical, electrical or fluidic power units. A "dump valve" or pressure relief valve has a relatively large dump port through which fluid pressure within a valve cavity can be quickly relieved or drastically reduced by manually operating a valve stem/poppet arrangement that opens and closes the dump port. A "closure valve" or fast-actuating on-off valve has a valve poppet capable of opening or closing a fluid outlet within the valve cavity. This invention provides a novel design and operating principle that translate into much improved dump valves and closure valves, particularly those suitable for high-pressure fluid flow control applications.

2. Description of Prior Art

New technology that has evolved during the recent fifteen years relates to generation and use of high-velocity waterjets, such technology often being referred to as high-pressure waterjetting technology. Conventional waterjets are commonly used to clean industrial and commercial equipment, with or without additives such as detergents or abrasives. In such applications, a hand held lance is used to aim the waterjet at the target. Such conventional waterjet lances are generally equipped with a hand or foot operated on-off valve or dump valve, depending upon several factors, such as the type of pump, fluid pressure, and the particular application. Currently, waterjetting is applied with conventional and manually operated valves at static water pressures in excess of 10,000 pounds per square inch (psi). At water pressures below 5,000 psi, a variety of conventional dump valves and closure valves can be operated by human hand or foot forces, for quick operation of a waterjet lance. Such conventional valves are reasonably safe and reliable. However, as the water pressure increases, operation of a fast-actuating fluid valve with human forces becomes difficult since the stresses from the fluid become very high and thus causes problems with fluidic sealing. Currently, conventional manually operated dump valves and closure valves have significant shortcomings, particularly those which operate at fluid pressures in excess of 10,000 psi. A high-pressure fluid control valve according to this invention eliminates such shortcomings.

In order to appreciate the novelty of this invention, it is necessary to describe prior art related to manually-operated dump valves and closure valves. Conventional waterjet lances equipped with a dump valve are commonly supplied by a positive displacement crank shaft pump that resembles a car or truck engine. Such positive displacement pump typically has three or five sets of cylinder and plunger arrangements, and is often driven with an electric motor or engine. Such pumps are capable of delivering water at high-pressures in excess of 10,000 psi. A conventional waterjet lance is generally tubular in form and has a hand or foot operated dump valve. Such dump valve has a fluid inlet port that is connected to a pump through a high-pressure hose or tube, a fluid outlet port that is connected to an outlet tube and ultimately connected to a nozzle assembly having a prescribed orifice for generating a high velocity waterjet to accomplish work, and a dump port that is connected to a short section of tubing.

U.S. Pat. No. 3,672,575 discloses a typical conventional dump valve used in waterjetting. FIG. 1 of my drawings shows a typical hand operated dump valve for waterjetting. According to FIG. 1, a conventional valve body 1 has a central cylindrical valve cavity 2 that is connected to a water inlet tube 3 and a water outlet tube 4, and has a valve seat 5 with a central dump port 6. The valve seat 5 can have a seal 7 and may be secured within a recess provided within the valve body 1 by a valve cover 8, anchor bolts 10 and a valve cover seal 9. The valve cover 8 has a fluid passage 11 which is in communication with the dump valve port 6 and a short dump tube 12. A cylindrical valve plunger 13 having a flat, coned or rounded end is mounted within the valve cavity 2 and is in contact with the valve seat 5. The valve plunger 13 is free to slide within the valve cavity 2, through a plunger seal assembly 14 which is positioned at an opposite end of the valve cavity 2. An opposite end of the valve plunger 13 is positioned outside of the valve cavity 2. The plunger seal assembly 14 has a cylindrical shoulder 15 and a bias spring 16. The valve plunger shoulder 15 and the associated bias spring 16 are generally positioned within a recess in the valve body 1. The valve plunger shoulder 15 is in contact with a cam end of an elongated valve trigger 17 which is pivotally mounted with respect to a valve handle 19. By pulling the valve trigger 17 against the valve handle 19, through the cam action, the valve plunger 13 is pushed or moved upward to seal off the dump port 6. Releasing the valve trigger 17 results in a downward movement of the valve plunger 13, due in part to the action of the bias spring 16. In waterjetting operations, pressurized water from a pump enters the valve through the inlet tube 3 and is discharged from the valve through both the outlet tube 4 and the dump tube 12. The dump port 6 is generally relatively large and thus the water is discharged from the valve at a relatively low velocity and corresponding low impact force.

To generate a relatively high impact waterjet according to the '575 patent, an operator must pull the valve trigger 17 against the handle 19 and thus cause the dump port 6 to be closed and sealed off by the valve plunger 13. As a result, the water is only discharged through the nozzle assembly at the end of the outlet tube 4. Since the nozzle assembly has a prescribed orifice of a significantly smaller size than the dump port 6, water inside the valve 20 builds up to a prescribed pressure level. When the operator releases the trigger 17, the waterjetting operation is stopped. The water would then be discharged from the valve 20 through both the nozzle and the dump tube 12, with the majority of the water being discharged through the dump tube 12, particularly without a relatively high impact force.

The dump valve according to the '575 patent is commonly used in waterjet lances. Other conventional devices have slight variations in the design of the components, particularly in the cam arrangement for moving the valve plunger. However, the basic operational principle remains the same throughout such conventional dump valves; a human hand or foot force is necessary to close the dump port and to maintain the dump port closed during the waterjetting operation. Other conventional dump valves may have a compression spring or springs to assist the manual operation, but the main force to maintain the dump port closed is still derived from the human hand or foot force. Closing the dump port in such conventional valves is accomplished with fluid pressure within the cavity at a relatively low level at the moment the dump port closes. However, such conventional dump valves present problems in maintaining the dump port closed during the waterjetting operations, particularly at the prescribed system operating pressure. For a conventional dump valve to properly function, the valve plunger and the valve seat must perfectly mate. The sealing circle between the valve plunger and the valve seat must be absolutely fluid tight and have a diameter only slightly smaller than the diameter of the valve plunger, so that the forces exerted on the valve plunger by the pressurized fluid within the cavity is relatively small for accommodating a normal hand force applied to the trigger.

The magnitude of fluid induced force on the valve plunger of a conventional dump valve can be quite significant and difficult to overcome by human hand forces, particularly if the valve plunger does not perfectly mate with the valve seat, which can be misaligned or worn out. For example, if the cross-sectional area of the valve plunger, as seen by the valve plunger seal assembly, is 0.001 in$^2$ larger than the cross-sectional area of the seal circle on the valve seat, then a force of 20 lb$_f$ will be generated by 20,000 psi water within the valve, in a direction of pushing the valve plunger outward. To keep the dump port closed, the human hand must then provide sufficient force on the trigger to overcome the fluid force. Such situation can become less operable if the seal between the valve plunger and the valve seat is not perfect and pressurized water escapes into the contact surface between the valve plunger and the valve seat, due to the relatively large fluid induced force that may result on the valve plunger. Therefore, a common problem with conventional dump valves is leakage which thus causes human fatigue, since the constant hand force applied to the handle must be maintained to achieve the prescribed operating system pressure.

According to the '575 patent, if the diameter of the sealing circle on the valve seat is slightly larger than the diameter of the valve plunger, as seen by the plunger seal, then sealing the dump port will be assisted by pressurized fluid within the valve cavity, since the fluid induced forces are applied in a direction opposite of the pushing force of the plunger, as the plunger moves upward against the valve seat. In such case, the dump port will be difficult to open since the bias spring may not provide sufficient force to pull the valve plunger from its seat. If the bias forces of the spring are significantly increased, then the human hand force must fight the spring action at all times. Thus, it is obvious that there is a fine balance which must be maintained in order for the conventional dump valve to function properly. It is quite difficult to obtain such fine balance since the conventional dump valves in waterjetting operations are well known for their unreliability and difficult operation. Leakage of water through the dump port and required significant hand forces are often experienced. A high pressure fluid control valve according to this invention circumvents such shortcomings and provides more reliable and effective performance.

The "dead-end" valve or closure valve is another conventional manually operated flow control valve currently in use in the waterjetting industry. Such valve is basically a manually operated fast-actuating on-off valve. FIG. 2 of the drawings of this disclosure shows a conventional closure valve 30 having valve body 31 with central cylindrical valve cavity 32 in communication with inlet tube 33 and outlet tube 34. Valve seat 35 is mounted within valve cavity 32 and has central outlet port 36. Lever trigger 37 and its pivot 38 are used to engage pivoting cam assembly 50, which engages sliding piston 45. Sliding piston 45 is mounted within cylindrical cavity 51, axially in line with valve cavity 32. Handle 39 is attached to valve body 31 with anchor bolts 40. Cylindrical valve stem 43 is mounted within valve cavity 32 and has a coned tip or an attached valve poppet for opening and closing outlet port 36. The outer end of valve stem 43 extends outside of valve cavity 32, through stem seal assembly 44, and into cylindrical cavity 51 to contact stem piston 45. Valve stem 43 and stem piston 45 can be either an integral piece or two separate components. The opposite end of stem piston 45 abuts stem spring 46 which provides a force necessary for normally closing outlet port 36.

When the valve assembly of FIG. 2 is not in use, stem spring 46 is installed into valve body 31 under compression and thus exerts constant force against stem piston 46 from right to left, as shown in FIG. 2, and thus forces valve stem 43 into a normally closed and seated position against valve seat 35, thereby closing outlet port 36. Such force must be strong enough so that outlet port 36 remains closed when pressurized fluid is introduced into valve assembly 30. To open valve assembly 30, a user applies hand forces against trigger 37 and thereby pulls trigger 37 toward handle 39. Through cam assembly 50, the pulling force upon trigger 37, toward handle 39, produces a force pushing stem piston 45 from left to right, as shown in FIG. 2. Stem spring 46 is thus compressed and valve stem 43 is pushed by fluid forces from left to right, as shown in FIG. 2, thus opening outlet port 36. FIG. 3 illustrates an open position of outlet port 36, according to the conventional closure valve as shown in FIG. 2.

Conventional closure valves vary in design, particularly in the mechanical linkage used to produce sliding motion of the valve stem. However, most conventional closure valves share the same basic operating principle which requires hand forces to overcome a spring force in order to initially open and maintain open the fluid outlet of the valve assembly. Furthermore, releasing such hand force with conventional closure valves results in restoring the spring force exerted against the valve stem and thereby closing the fluid outlet of the valve assembly. Such basic operating principles of the conventional closure valves indicates that several design aspects are vital to proper functioning of such conventional closure valves. For example, the stem spring must provide a force significantly greater than the fluidic force exerted on the valve stem when the outlet port is open. The hand force applied to the valve stem through the trigger lever and cam assembly must be greater than the total force involved in seating the valve stem against the valve seat when closing the fluid outlet of the valve assembly. Also, there must be a net force in favor of opening the fluid outlet from the pressurized fluid, if the valve stem and the valve piston are two separate components. In other words, the outlet port must not have a diameter greater than the diameter of the valve stem, as seen by the seal assembly. Furthermore, if the valve stem and the stem piston are an integral component or are tightly engaged, then the hand force applied to the trigger level must include the force necessary for unseating the valve stem from the valve seat.

It is thus apparent that in order for conventional closure valves to function at relatively high fluid pressures, there must exist a fine force balance within the valve assembly. For example, if the diameter of valve stem 43, as shown in FIGS. 2 and 3, is 0.125 inches, then the total cross-sectional area is 0.0123 in$^2$. If the valve is operated at a fluid pressure of 30,000 psi, a force of 368 lb$_f$, which is the product of the fluid pressure and the cross-sectional area of the valve stem, will be exerted against the valve stem when the outlet port is opened and the valve assembly is operating. Such fluid force of 368 lb$_f$ is combined with a hand force to keep the stem spring further compressed and to keep the outlet port open. When the hand force is released, valve spring 46 must provide a force greater than 368 lb$_f$ in an opposite direction of the fluid induced force on the valve stem, in order to close the outlet port. These forces can only be achieved by using large die springs that are impractical for use in hand held devices. Thus, conventional closure valves are designed to reduce the diameter of the valve stem to a relatively small dimension, such as 0.063 inches, which corresponds to a cross-sectional area of 0.0031 in$^2$, or 92 lb$_f$ at a static fluid pressure of 30,000 psi. Such 92 lb$_f$ can be overcome with 1-inch diameter die springs. Unfortunately, valve stems having a diameter of 0.063 inches are not strong enough, even if constructed of exotic metals, particularly if they are exposed to bending stresses. Using such small diameter valve stems also limits the size of the fluid outlet ports to a relatively small dimension, and thus increases the fluid pressure drop when fluid is flowing through the valve during waterjetting operations. Such valve stems reduce the overall effectiveness of the conventional valve. Thus, conventional closure valves used in waterjetting operations have serious shortcomings, particularly with respect to pressure capabilities. At relatively high fluid pressures, conventional valve stems are likely to break and thus create unsafe operating conditions. This invention overcomes such shortcomings and unsafe operating conditions and provides a superior closure valve for relatively high-pressure fluid control operations.

SUMMARY OF THE INVENTION

It is one object of this invention to provide an improved manually operated pressure relief or dump valve for use in waterjetting operations, or other operations.

It is another object of this invention to provide a pressure relief or dump valve which is easier for a user to operate, has more reliable components, reduces or eliminates fluid leakage through the valve port, and provides safe operation of the dump valve.

It is another object of this invention to provide a closure valve or on-off valve for use in waterjetting or other applications, which uses energy contained within the fluid to assist valve operation.

It is still another object of this invention to provide a basic valve assembly that can be advantageously adapted to powered operations, and a pneumatic, electrical or hydraulic actuator or actuators can be attached for the purpose of operating the valve for fluid control purposes.

BRIEF DESCRIPTION OF THE DRAWINGS

Other objects of this invention will be apparent when this invention is examined from a broader perspective, in conjunction with the drawings wherein.

DESCRIPTION OF PREFERRED EMBODIMENTS

From the previous discussion of the conventional hand-operated dump valves and closure valves, it is apparent that the hand or foot force is the primary power source for operating such conventional valves. One major disadvantage of such conventional valves is that due to the pressurized fluid within the valve, a tremendous amount of potential energy, or stored energy, is available but not used for operating the conventional valve. According to preferred embodiments of this invention, two basic types of flow control valves use fluid power to assist both opening and closing the fluid outlet ports. Thus, relatively little human force is necessary to operate a control linkage that directs the high pressure fluid to desired locations and thus perform the prescribed tasks. The dump valves and closure valves according to this invention are easier for the operators to use and have a relatively long useful life for each component, thus making the valve according to this invention safer to use, as compared to conventional valves.

Figure 4:
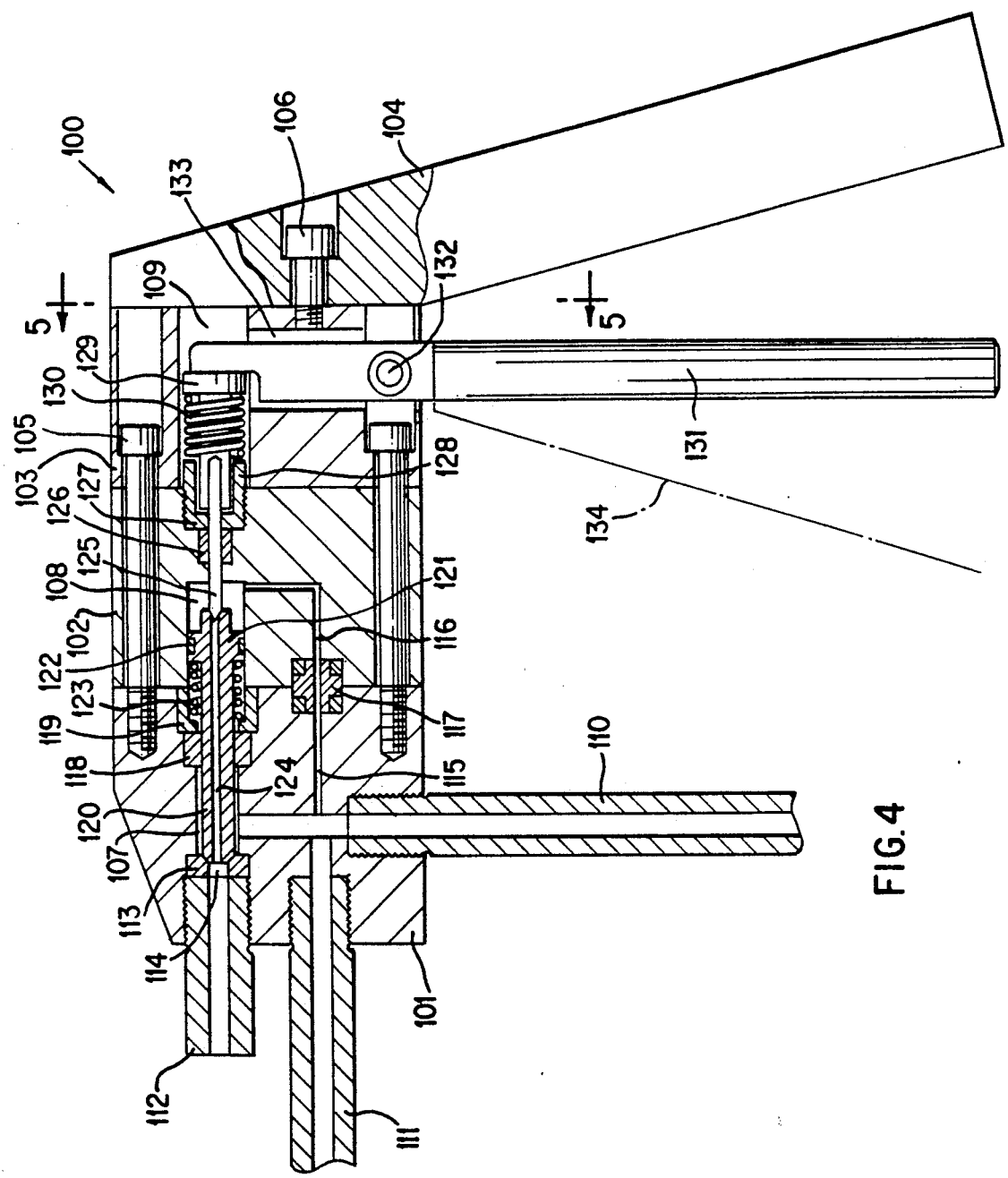
FIG. 4 is a partial cross-sectional side view of a manually operated dump valve, according to one preferred embodiment of this invention, with the dump valve in an operating position and a dump port closed by a plunger.

FIG. 4 shows one preferred embodiment of a manually operated dump valve, according to this invention, which is particularly suited for hand held waterjetting operations. Dump valve assembly 100 is shown as having a generally rectangular exterior shape with four major components secured together, preferably by tie bolts 105. It is apparent that dump valve assembly 100 can have any other suitable overall shape. Dump valve assembly 100 is preferably constructed with stainless steel, alloy steel and/or aluminum alloys. The four major components, valve body 101, middle body 102, adapter block 103 and handle 104 are secured together with tie bolts 105 and handle anchor bolts 106, as shown in FIG. 4. Valve body 101 has a central cylindrical valve cavity 107 that is axially in line with cylindrical plunger shoulder cavity 108 of middle body 102, which is axially in line with cylindrical dump valve spring cavity 109 of adapter block 103. The three cylindrical cavities 107, 108 and 109 are connected by through holes which accommodate various internal elements of this invention. Valve cavity 107 is in communication with fluid inlet tube 110, fluid outlet tube 111 and dump tube 112, through dump valve seat 113 having central dump port 114. Valve cavity 107 is also in communication with plunger shoulder cavity 108 through side passage 115 within valve body 101, and in communication with fluid passage 116 through seal assembly 117 which is mounted between valve body 101 and middle body 102. As shown in FIG. 4, seal assembly 117 preferably comprises two seals and a middle rigid seal support for routing pressurized fluid through the interface of valve body 101 and middle body 102. Valve cavity 107 is terminated at one end, in a fluid-tight manner, by dump valve seat 113 and at the opposite end by plunger seal assembly 118 and seal support 119. Valve cavity 107 accommodates cylindrical valve plunger 12 which has a flat, coned or rounded end toward dump valve seat 113. Valve plunger 120 also has cylindrical plunger shoulder 121 which accommodates shoulder seal assembly 122. Plunger shoulder 121 is positioned within shoulder cavity 108 and compression spring 123 is positioned around a downstream portion of valve plunger 120.

Valve plunger 120 has central through hole 124 for dumping fluid. Valve plunger 120 is free to slide within valve cavity 107. Plunger shoulder cavity 108 is divided into two chambers by valve plunger shoulder 121 and seal assembly 122, during sliding movement of valve plunger 120. Referring to FIG. 4, the portion of plunger shoulder cavity 108 to the right of plunger shoulder 121, as shown in FIG. 4, is always filled with fluid during operation of dump valve assembly 100, and is referred to as a pressure chamber. The opposite side, or left side as shown in FIG. 4, of plunger shoulder 121, is where compression spring 123 is positioned, is always open to atmosphere and is thus referred to as the air chamber. In one preferred embodiment according to this invention, the air chamber portion of plunger shoulder cavity 108 is in communication with the ambient atmosphere surrounding dump valve assembly 100 through an opening or infiltration crack formed at the surfaces where valve body 101 abuts middle body 102, since a sealing gasket is preferably not used.

Figure 5:
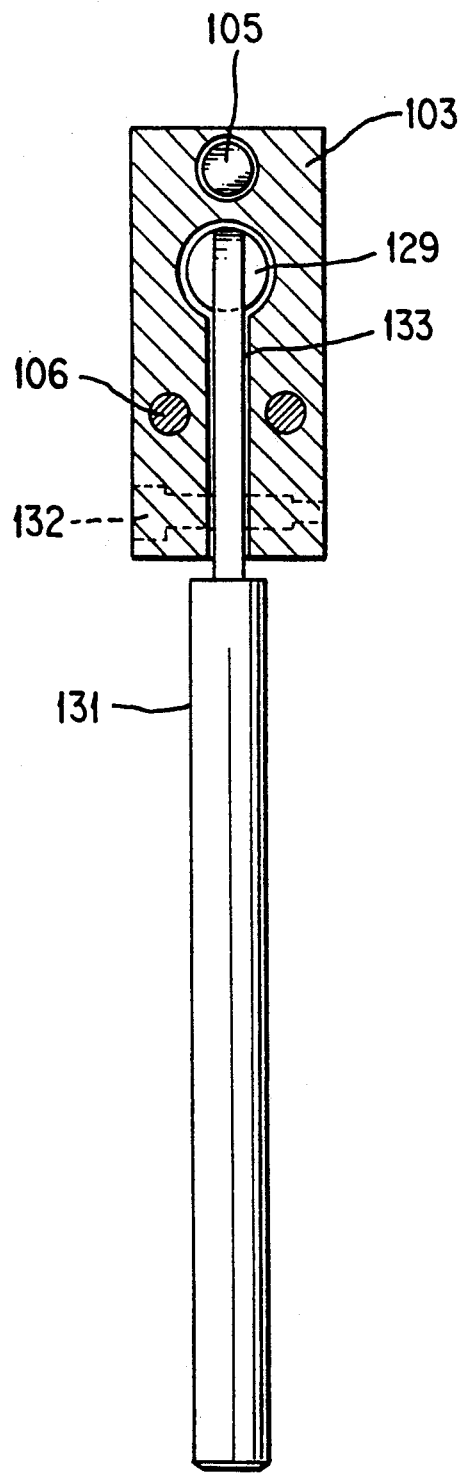
FIG. 5 is a partial sectional view, taken along line 5—5, as shown in FIG. 4.

It is apparent that the cross-sectional area of plunger shoulder 121 is significantly larger than the cross-sectional area of valve plunger 120. In one preferred embodiment according to this invention, the cross-sectional area of plunger shoulder 121 is at least 50 percent larger than the cross-sectional area of the smaller diameter portion of valve plunger 120. Plunger seal assembly 118 is used to keep pressurized fluid within valve cavity 107. Plunger shoulder seal assembly 122 keeps the pressurized fluid from leaking into the portion of plunger shoulder cavity 108 in which compression spring 123 is mounted. Plunger shoulder cavity 108 accommodates cylindrical dump valve stem 125. Dump valve stem 125 has a sharp conical end which intimately mates with plunger central through hole 124 to form a fluid-tight connection when dump valve stem 125 is forced against valve plunger 120, within central through hole 124. The through hole of middle body 102, between shoulder cavity 108 and dump valve spring cavity 109, is an enlarged cavity for accommodating dump valve stem seal assembly 126 and has a threaded portion for accommodating seal support 127, as shown in FIG. 4. Seal support 127 has a central cylindrical cavity for accommodating cylindrical stem anchor 128. Seal support 127 and stem anchor 128 are positioned within dump valve spring cavity 109. Stem anchor 128 has a central hole for accommodating dump valve stem 125 at one end and has a cylindrical shoulder 129 at the opposite end. Compression spring 130 is positioned around stem anchor 128, between the shoulder portion of seal support 127 and stem anchor shoulder 129. Stem anchor shoulder 129 abuts a notched end of elongated trigger lever 131 which pivots about pivot shoulder screw 132. Trigger lever 131 has a flat end portion positioned within slot 133 of adapter block 103 and trigger lever 131 is free to exert force against stem anchor shoulder 129 when trigger lever 131 is pulled by hand force toward handle 104. FIG. 5 provides a view of such arrangement.

As illustrated in FIG. 4, dump valve assembly 100, according to one preferred embodiment of this invention, has a relatively stout valve plunger 120, as compared to conventional valve plungers, that is not directly connected to trigger lever 131, in terms of force relationship. In an at rest position, when there is no pressurized fluid within dump valve assembly 100 and trigger lever 131 is in a released position, compression springs 123 and 130 are in an expansion mode and thus push valve plunger 120 and stem anchor 128, to the right as shown in FIG. 4, to open dump port 114. Trigger lever 131 is in a cocked position when in a position illustrated by dashed line 134. When pressurized water enters dump valve assembly 100, it is eventually discharged through both outlet tube 111 and dump tube 112, with relatively low velocity and thus little force. Since dump port 114 is relatively large, no significant levels of fluid pressure will build inside dump valve assembly 100, even if pump means generate a large flow rate.

To begin waterjetting operations at a normal working pressure, the user or operator pulls trigger lever 131 toward handle 104, thereby exerting force on stem anchor shoulder 129 which pushes dump valve stem 125 from right to left, as shown in FIG. 4. Dump valve stem 125 in turn pushes valve plunger 120 from right to left, as shown in FIG. 4, which eventually closes dump port 114. Such action is easily accomplished due to the fact that both compression springs 123 and 130 have modest size and strength, and further due to the fact that there are very small magnitudes of fluid forces acting against valve plunger 120, because of the relatively low fluid pressure within dump valve assembly 100. However, once dump port 114 is closed by valve plunger 120, through hand forces acting on trigger lever 134, fluid pressure within dump valve assembly 100 begins to build as the fluid is forced to flow only out of fluid outlet tube 111, which typically has an orifice or orifices sized to produce a prescribed operating pressure, in view of the capacity of the supply pump means.

As fluid pressure increases within dump valve assembly 100, fluid forces working on plunger shoulder 121 are steadily increased and thus provides an increased seating force on valve plunger 120, against dump valve seat 113. Such seating forces eventually reach very high magnitudes. During such increased pressure action, dump valve stem 125 abuts against valve plunger 120, through only hand forces.

Due to the relatively small size of dump valve stem 125 and its intimate mating with through hole 124 of valve plunger 120, the fluid forces exerted on dump valve stem 125 are relatively small and not enough to cause a significant increase in forces necessary to operate trigger lever 131. Thus, user or operator fatigue is reduced if not eliminated. The valve seating force from the fluid working on plunger shoulder 121 is much greater than the fluid force working on valve plunger 120, at the end of valve plunger 120 which is in contact with dump valve seat 113. Thus, relatively little, if any, fluid leakage occurs through dump port 114 around valve plunger 120.

To stop waterjetting or other pressurized operations, the user simply releases trigger lever 131, which initiates a chain of mechanical events. First, stem anchor 128 moves toward the right, as shown in FIG. 4, due to the expansion forces of compression spring 130. As a result, dump valve stem 125 is forced to the right, as shown in FIG. 4, by pressurized fluid within plunger shoulder cavity 108, and thus opens through hole 124 of valve plunger 120. Consequently, pressure within plunger shoulder cavity 108 immediately drops, due to its relatively small volume. Meanwhile, fluid pressure within valve cavity 107 and elsewhere throughout dump valve assembly 100 remains relatively high, with respect to the pressure within plunger shoulder cavity 108, due to the fact that side passage 115 and fluid passage 116 are constructed of relatively small cross sections, as compared to the cross-sectional areas of valve cavity 107. Thus, the relatively high pressure fluid within valve cavity 107 quickly pushes valve plunger 120 toward the right, as shown in FIG. 4, and thus opens dump port 114. Compression spring 123 assists in opening dump port 114, thus ensuring prompt and complete opening of dump port 114. As a result, the pressure of fluid within dump valve assembly 100 is drastically reduced as the incoming fluid again flows to both fluid outlet tube 111 and dump tube 112.

To resume pressurized fluid operations, the user simply pulls trigger lever 131 toward handle 104. It is apparent that the movement of valve plunger 120 is basically a function of fluid induced forces of relatively high magnitude, and yet the internal components move in a gentle fashion, cushioned by the fluid alone or combined with forces from compression springs 123 and 130. Thus, the valve components of this invention do not slam into each position and thus do not create undesirable stresses which cause failure of the components. In fact, the only element which experiences wear are the seals which can be readily changed periodically, such as during a preventive maintenance program.

Figure 6:
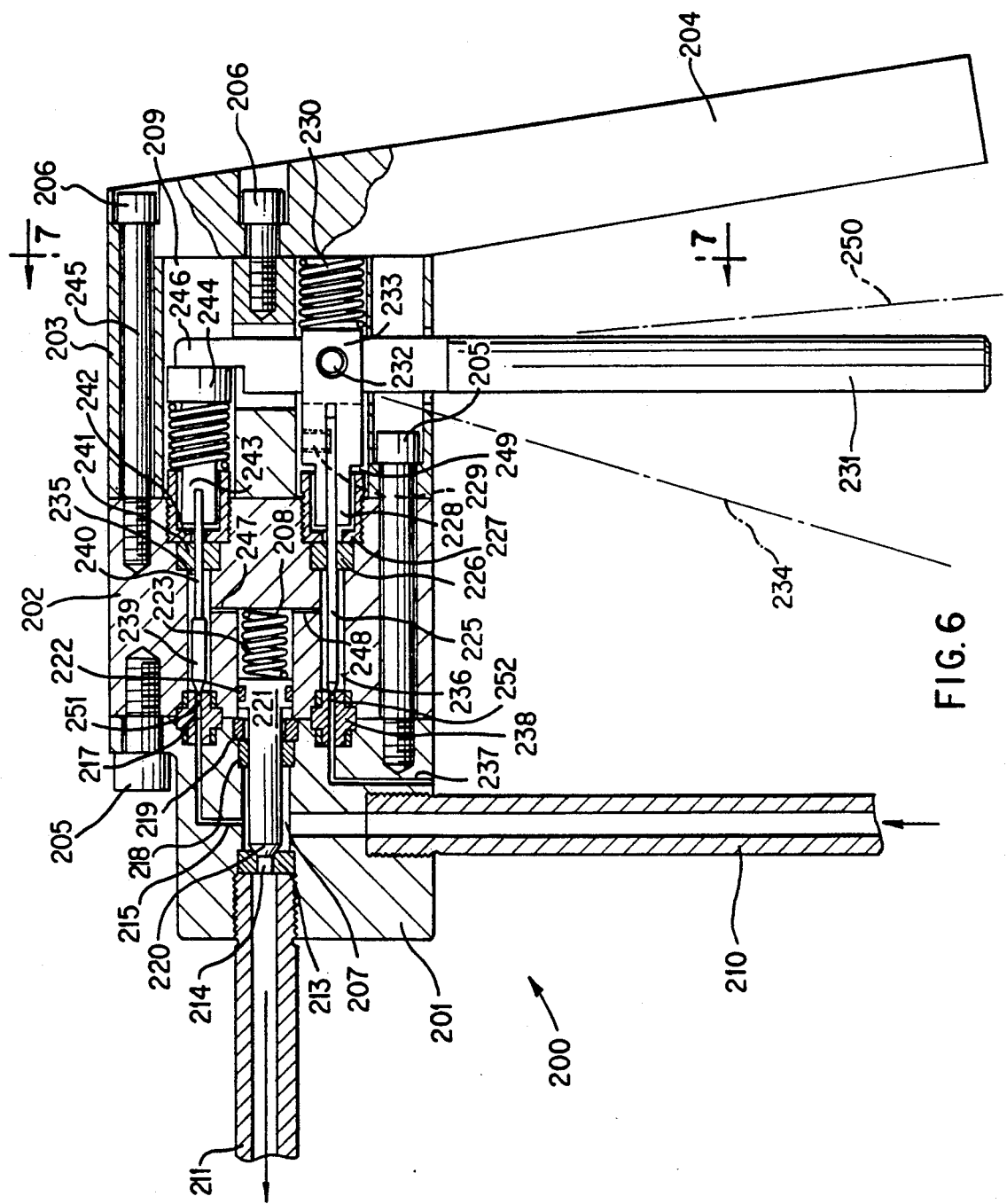
FIG. 6 is a partial cross-sectional side view of a hand-operated closure valve, according to another preferred embodiment of this invention, with a fluid outlet port in a normally closed position.

FIG. 6 shows a closure valve according to another preferred embodiment of this invention. Closure valve assembly 200 is shown as having a generally rectangular exterior shape. It is apparent that other suitable general shapes can be used. The four main pieces of closure valve assembly 200, which are valve body 201, middle body 202, adapter block 203 and handle 204, are preferably assembled together with tie bolts 205 and handle anchor bolts 206. When bolted together, the four main elements create fluid passages and cavities necessary for operating the internal components. Main valve cavity 207 is in line axially with plunger shoulder cavity 208, which is within middle body 202. Cylindrical supply valve cavity 235 and cylindrical dump valve cavity 236 are within middle body 202. Both supply valve cavity 235 and dump valve cavity 236 are approximately parallel to plunger shoulder cavity 208 and both extend through the entire middle body 202. Main valve cavity 207 is in communication with fluid inlet tube 210 and fluid outlet tube 211. Outlet valve seat 213 has central outlet port 214 in communication between fluid outlet tube 211 and main valve cavity 207. Fluid passage 215 has a small cross-sectional area, relative to supply valve cavity 235, dump valve cavity 236 and main valve cavity 207, and is in communication with supply valve cavity 235 through fluid passage 251 of interfacial seal bushing 217 which is positioned between valve body 201 and middle body 202. Valve body 201 has fluid passage 237 which is in communication between the atmosphere and dump valve cavity 236 of middle body 202, through fluid passage 252 of interfacial seal bushing 238 which is positioned between valve body 201 and middle body 202.

Cylindrical main valve cavity 207 is sealed at one end by outlet valve seat 213 and is sealed at the opposite end by plunger seal assembly 218 and seal support 219, with valve plunger 220 in its mounted position. Valve plunger 220 has a flat, coned or rounded end in contact with outlet valve seat 213 when sealing central outlet port 214. Valve plunger 220 has cylindrical shoulder 221 at its opposite end. Cylindrical shoulder 221 forms shoulder seal assembly 222. The cross-sectional area of shoulder seal assembly 222 is preferably at least 50 percent larger than the cross-sectional area of the smaller diameter portion of valve plunger 220. Plunger shoulder 221 abuts compression spring 223 which is slightly under compression when installed. Compression spring 223 exerts a constant force urging valve plunger 220 against valve seat 213.

Still referring to FIG. 6, supply valve cavity 235 houses valve poppet 239, preferably having a bullet shape, and supply valve stem 240. In another preferred embodiment, valve poppet 239 has a coned end that mates within fluid passage 251 of seal bushing 217 and a blunt end that contacts valve stem 240, which extends outside of supply valve cavity 235 through stem seal assembly 241 and threaded seal support 242. Threaded seal support 242 has a central cylindrical cavity to accommodate cylindrical stem anchor 243. Stem anchor 243 has a cylindrical shoulder 244 that retains sliding spring 245 around stem anchor 243, between seal support 242 and anchor shoulder 244. The opposite end of cylindrical shoulder 244 contacts notched end 246 of trigger lever 231. Trigger lever 231 pivots about pivot pin 232. Supply valve cavity 235 has a relatively small cross-sectional area of fluid passage 247 toward the rear of plunger shoulder cavity 208.

Figure 7:
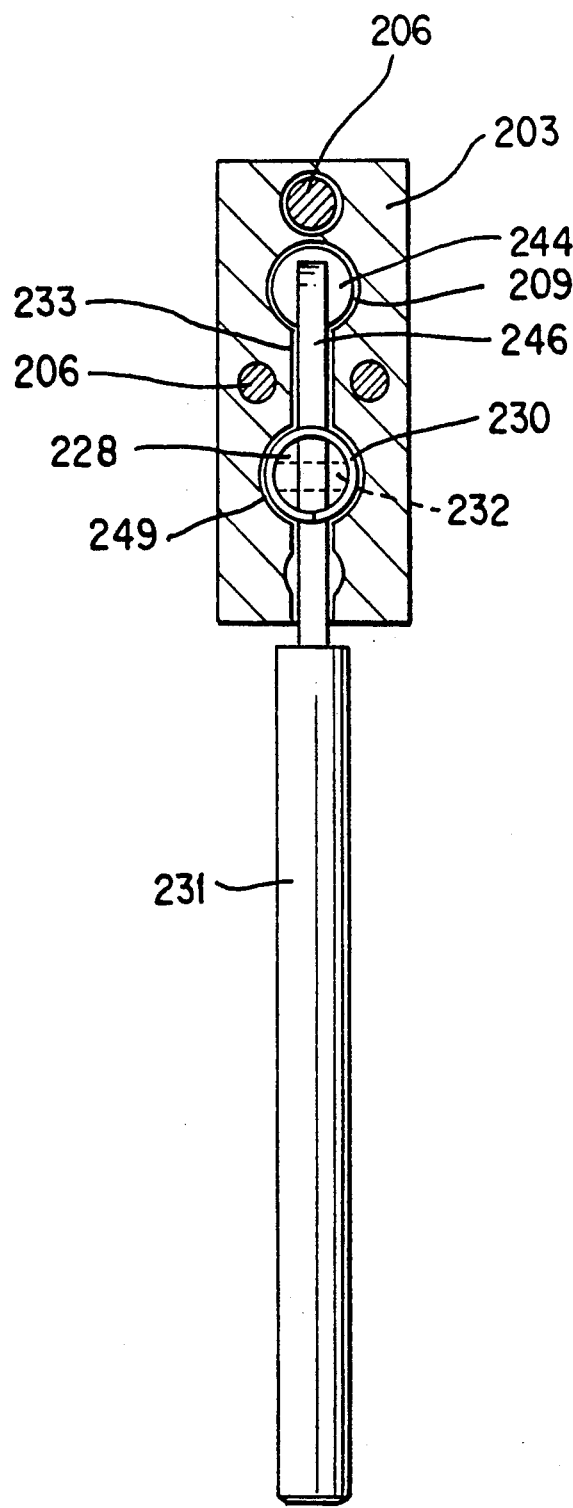
FIG. 7 is a partial sectional view, taken along line 7—7, as shown in FIG. 6.

As shown in FIG. 6, dump valve cavity 236 houses cylindrical dump valve stem 225 which has a sharp conical end that mates within central fluid passage 252 of seal bushing 238. A blunt end of dump valve stem 225 extends outside of middle block 202, through stem seal assembly 226, threaded seal support 227, and into a central hole of cylindrical stem anchor 228. The blunt end portion of valve stem 225 has a flat to engage set screw 229, which is positioned within stem anchor 228. Stem anchor 228 has a slot at the end opposite to valve stem 225, for engaging trigger lever 231. Such opposite end of valve stem 225 abuts compression spring 230, which is under relatively slight compression when installed. Dump valve cavity 236 has a relatively small cross-sectional area fluid passage 248 toward the rear of plunger shoulder cavity 208. Referring to FIG. 7, adapter block 203 has slot 233 for accommodating trigger lever 231. Pivot pin 232 extends through trigger lever 231 and is mounted within stem anchor 228. It is apparent that pivot pin 232 is not fixed with respect to adapter block 203 and thus can move along a central axis of cylindrical cavity 249, which houses dump valve anchor 228.

Referring back to FIG. 6, the three springs have relatively small size and very modest strength and are installed for different purposes. When closure valve assembly 200 is in an at rest position and there is no fluid within closure valve assembly 200 or the fluid is at pressures far below the designed operating pressure, valve plunger 220 is at its left most position, as shown in FIG. 6, to seal outlet port 214 with the assistance of forces from compression spring 223. Similar to the elements of dump valve assembly 100 as shown in FIG. 4, plunger shoulder 221 and shoulder seal assembly 222 always divide shoulder cavity 208 into two chambers. The right side, or the spring side, as shown in FIG. 6, of shoulder cavity 208 is exposed to high-pressure fluid. The left side, as shown in FIG. 6, of plunger shoulder 221 is exposed to the atmosphere. This is a very important aspect of this invention since such arrangement allows fluid pressure to build up across plunger shoulder 221 of closure valve assembly 200, or plunger shoulder 121 of dump valve assembly 100, in order to generate forces considerably greater than those forces exerted on valve plunger 220, or 120, within main valve cavity 207, or 107, for the purpose of opening and closing central outlet port 214, or central dump port 114, all respectively.

As shown in FIG. 6, when closure valve assembly 200 is in an at rest position, compression spring 230 is extended and exerts force against valve stem anchor 228 and dump valve stem 225, to close central fluid passage 252 of seal bushing 238. At the same time, sliding spring 245 is also extended and thus pushes notched end 246 toward the right, as shown in FIG. 6, resulting in a cocked position of trigger lever 231, as shown by dashed line 234. In such cooked position, supply valve stem 240 is at a relaxed or retracted position, and so is supply valve poppet 239. Side passage 215 is clear and open all the way to shoulder cavity 208 and to dump valve cavity 236. Such condition remains unchanged when pressurized fluid is introduced into closure valve assembly 200, as fluid will enter into plunger shoulder cavity 208 and exert a strong force against valve plunger 220 to seal outlet port 214 even tighter. Dump valve stem 225 remains in a closed position as compression spring 230 and the fluid passage of seal bushing 238 are designed to accommodate the peak fluid pressure for which closure valve assembly 200 is designed.

To open outlet port 214, the user pulls trigger lever 231 against handle 204, from the position shown by dashed line 234 to a vertical position, as shown in FIG. 6. The first net result of pulling trigger lever 231 is that stem anchor 244 is forced toward the left, as shown in FIG. 6, such that valve poppet 239 mates within and closes central fluid passage 251 of seal bushing 217. Similar to that of dump valve assembly 100, as shown in FIG. 4, both seal bushings 217 and 238 of closure valve assembly 20 have a metallic center and two sets of outer or end seals. Thus, the central fluid passages of seal bushing 217 and seal bushing 238 can be sized and shaped as necessary for mating with valve poppet 239 and dump valve stem 225. With respect to closure valve assembly 200, supply valve cavity 235 is instantaneously filled with high-pressure fluid at the moment trigger lever 231 is pulled toward handle 204. Therefore, valve stem 240 is exposed to a powerful fluid force and must have a relatively small diameter size or cross-sectional area. Conversely, valve poppet 239 is immersed in the high-pressure fluid and thus can be readily moved. By pulling trigger lever 231 toward handle 204, fluid passage 251 is blocked by valve poppet 239 and plunger shoulder cavity 208 is then isolated from the supply of high-pressure fluid. By continued pulling of trigger lever 231 toward handle 204, a lever action is created with the pivot moved upward toward notched end 246 of trigger lever 231 and causes dump valve stem 225 to be forced toward the right, as shown in FIG. 6, to open dump fluid passage 237 and further compress dump compression spring 230. Instantly, fluid pressure within plunger shoulder cavity 208 is reduced and valve plunger 220 immediately is forced by fluid forces from left to right, as shown in FIG. 6, thus opening main fluid outlet port 214. At such point, high pressure water flows through outlet tube 211 to the nozzle assembly for generating a high-velocity water jet or for any other working purpose. In such condition, trigger lever 231 is at a position shown by dashed line 250. The hand force required to keep outlet port 214 open is approximately equal to the force required to further compress dump compression spring 230 and to keep valve poppet 239 in a seated position within fluid passage 251. Since fluid passage 251 is relatively small, it prevents fluid forces which are unmanageable through trigger lever 231. When trigger lever 231 is released, compression spring 230 and sliding spring 245 are immediately engaged into action and effectively move dump valve stem 225 from right to left, as shown in FIG. 6, to close fluid passage 252 and release the closure force on valve poppet 239, which results in opening fluid passage 251 and sending high-pressure fluid back into plunger shoulder cavity 208. Such action generates a relatively strong force to push valve plunger 220 into a position which closes outlet port 214. Closure of outlet port 214 completes an operating cycle of the valve.

Still referring to FIG. 6, closure valve assembly 200 can accommodate valve plungers having relatively large sizes and outlet ports 214 of comparable sizes. Thus, such enlarged elements tolerate larger stresses and thus do not break as easily as similar conventional elements. Furthermore, the fluid pressure drop across outlet port 214 of this invention is considerably less than across the outlet port of conventional closure valves. Contrary to the arrangement of conventional valves, trigger lever 231 according to this invention is not directly used to open or close the main outlet port 214 but rather acts against forces of relatively moderate levels which can be readily overcome by moment arm action of trigger lever 231. Both supply valve stem 240 and dump valve stem 225, according to this invention, are not subjected to high stresses and thus are not as prone to breakage as comparable elements of conventional closure valves. If either valve stem 225 or supply valve stem 240 according to this invention breaks, the main outlet port 214 remains closed and thus provides an inherent safety design aspect. Conventional closure valves do not offer the same level of safety since when the valve stem of a conventional closure valve breaks, the valve remains open.

Figure 8:
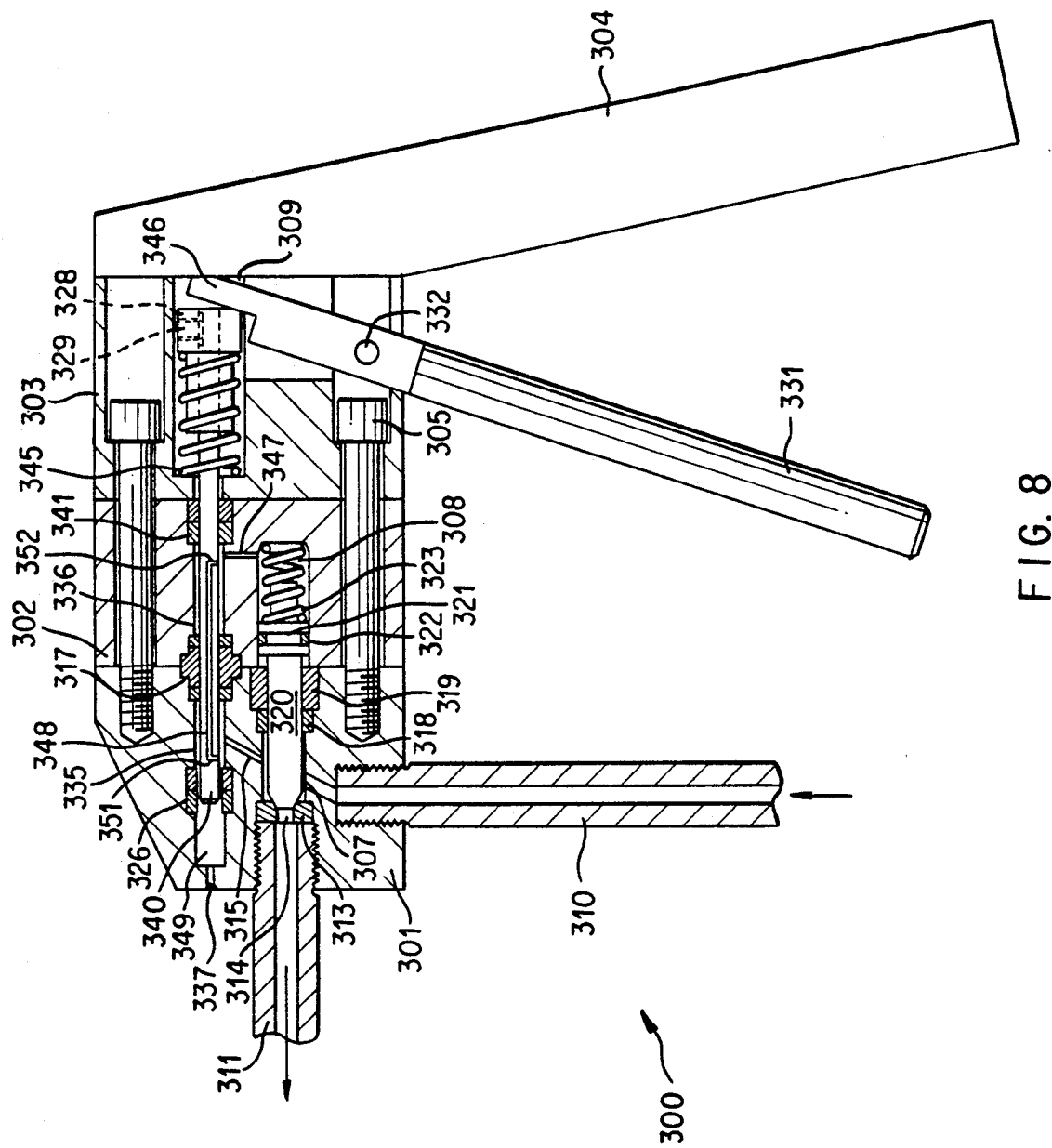
FIG. 8 is a partial cross-sectional side view of a hand-operated closure valve, according to another preferred embodiment of this invention, with a fluid outlet port in a normally closed position.

FIG. 8 shows yet another preferred embodiment according to this invention, of a hand-operated closure valve. It is apparent that the closure valve as shown in FIG. 8 can also be operated by a human foot if the trigger lever is arranged in a different manner, which would be apparent to a person skilled in the art. According to the embodiment shown in FIG. 8, a single valve stem is used to operate both the supply and dump operations of the plunger shoulder cavity. In a similar manner to closure valve assembly 200 as shown in FIG. 6 and previously discussed, closure valve assembly 300 comprises valve body 301, middle body 302, adapter block 303, handle 304, trigger lever 331, inlet tube 310, outlet tube 311, valve seat 313, valve plunger 320 with plunger shoulder 321 and shoulder seal assembly 322, compression spring 323, trigger pivot 332, and anchor bolts 305.

One difference between closure valve assembly 300 and closure valve assembly 200, as shown in FIG. 6, is the fluid control circuit of plunger shoulder cavity 308, as shown in FIG. 8. In this particular embodiment, a single elongated valve stem 340 with central fluid passage 348 at a front end and a flat at its opposite end. Fluid passage 348 has a forward side entrance 351 and a rearward side entrance 352. Valve stem 340 is housed within an elongated cylindrical fluid cavity that is formed by valve body 301, middle body 302 and adapter block 303. Three sets of stem seals are positioned along such cavities to define four separate compartments or cavities. Stem seal assembly 326 within valve body 301 has dump cavity 349 on a left side and supply cavity 335 on a right side, as shown in FIG. 8. Stem seal bushing 317 and its outer seals are positioned between valve body 301 and middle body 302, defining supply cavity 335 on the left and control cavity 336 on the right, as shown in FIG. 8. An additional stem seal assembly 341 is positioned between middle body 302 and adapter block 303, thereby defining control cavity 336 on the left and stem anchor cavity 309 on the right, as shown in FIG. 8. An opposite end of valve stem 340 engages cylindrical stem anchor 328 through set screw 329. Stem anchor 328 abuts notched end 346 of trigger lever 331 on one end and engages compression spring 345 at an opposite end. Trigger lever 331 and compression spring 345 provide forces in conjunction with trigger lever 331 to produce a push-pull action on valve stem 340.

Figure 9:
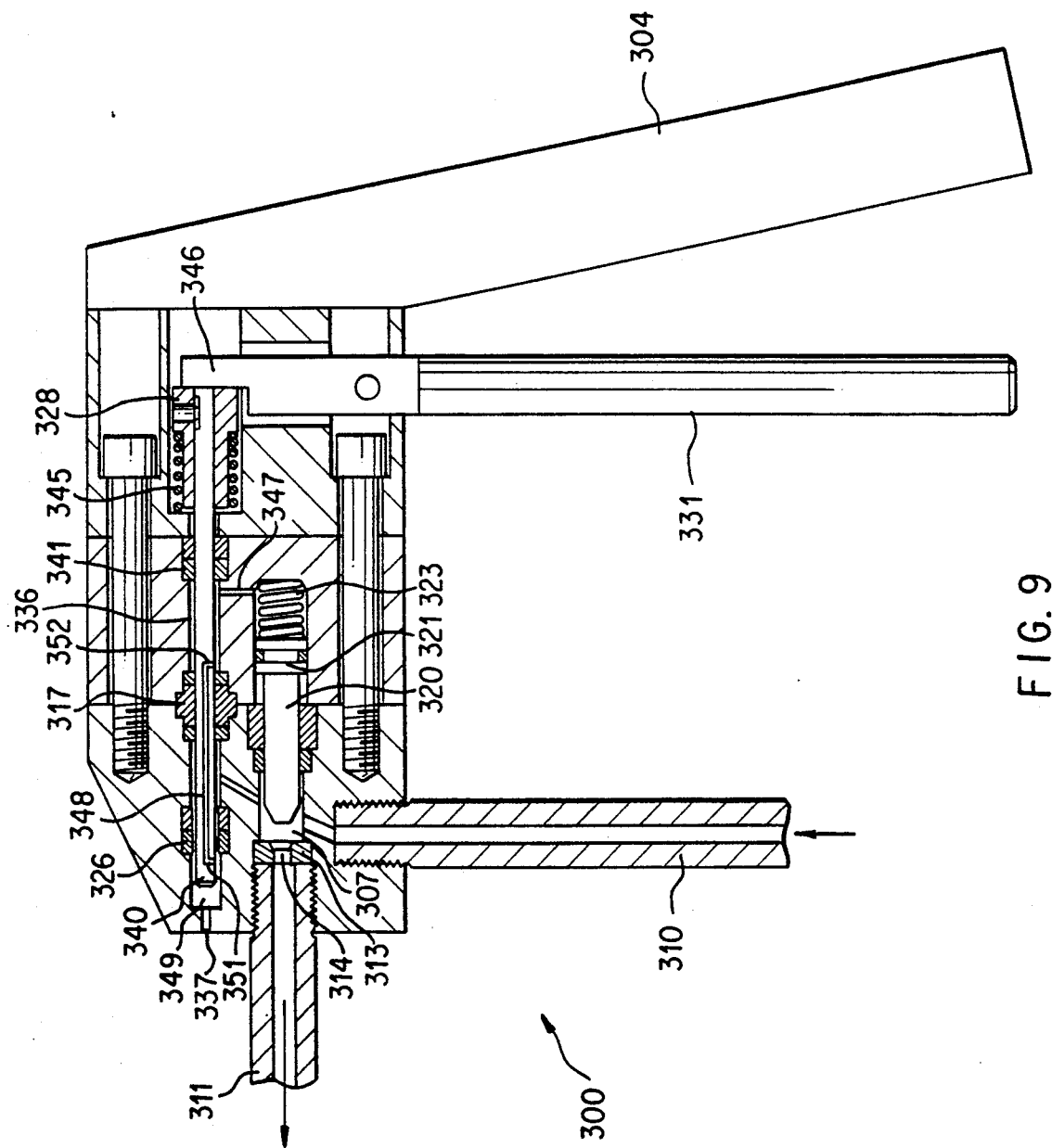
FIG. 9 is a partial cross-sectional view of the hand-operated closure valve as shown in FIG. 8, with the fluid outlet port in an open position.

Valve stem 340 has two basic positions depending upon the position of trigger lever 331. When trigger lever 331 is pulled toward handle 304, valve stem 340 is forced all the way to the left, as shown in FIG. 9. At its leftmost position, or dump position, forward side entrance 351 of valve stem 340 is positioned within dump cavity 349. When trigger lever 331 is released, as shown in FIG. 8, compression spring 345 expands and indirectly moves valve stem 340 to the right, as shown in FIG. 8, into a supply position where forward side entrance 351 is positioned to the right of stem seal assembly 326, within supply cavity 335. In such position, fluid passage 315 is in communication with main valve cavity 307 and supply cavity 335. Fluid passage 347 is in communication with control cavity 336 and plunger shoulder cavity 308. Similar to closure valve assembly 200, as shown in FIG. 6, plunger shoulder 321 and shoulder seal assembly 322 of closure valve assembly 300, as shown in FIG. 8, divide plunger shoulder cavity 308 into two portions, the pressure chamber or spring chamber to the right and the vented chamber or air chamber to the left, both as shown in FIG. 8. Similar to one preferred embodiment of FIG. 4, as discussed above, the air chamber is in communication with the surrounding ambient atmosphere through an infiltration crack inherently formed between valve body 301 and middle body 302. The cross-sectional area of plunger shoulder 321 is substantially larger than the cross-sectional area of the smaller diameter portion of valve plunger 320, which is positioned within main valve cavity 307.

Still referring to FIG. 8, when trigger lever 331 is in an at rest position, regardless of whether pressurized fluid is within closure valve assembly 300, valve outlet 314 is closed by valve plunger 320 due to the action of compression spring 323. Valve stem 340 thus is at its right-most position or supply position. When closure valve assembly 300 has pressurized fluid within it, the pressurized fluid enters into plunger shoulder cavity 308 through fluid passage 315, supply cavity 335, forward side entrance 351, central fluid passage 348 within valve stem 340, rearward side entrance 352, control cavity 336 and fluid passage 347. As a result, pressure builds within plunger shoulder cavity 308 and force is generated to push plunger shoulder 321, thus further enhancing the sealed closure of valve outlet 314. The magnitude of such force is the product of the fluid pressure and the cross-sectional area of plunger shoulder 321 at shoulder seal assembly 322. If the diameter of plunger shoulder 321 is, for example 0.438 inches, then the cross-sectional area is 0.151 in$^2$. At a fluid pressure of 30,000 psi, the force exerted on valve plunger 320 to close valve outlet 314 will be 4,530 lb$_f$, which is more than the force available from springs or hand lever actions. The pressurized fluid within valve cavity 307 exerts a force on valve plunger 320 in the direction of unseating valve outlet 314. Such force is considerably smaller than the closure force of 4,530 lb$_f$, since there is a substantially smaller surface area involved.

Referring to FIG. 9, closure valve assembly 300 is shown with trigger lever 331 pulled toward handle 304, thereby forcing valve stem 340 to the left, as shown in FIG. 9, or into a dump position. In such dump position, forward side entrance 351 is moved across stem seal assembly 326, to the left as shown in FIG. 9, to dump cavity 349. In such position, dump port 337 is in communication with the atmosphere and rearward side entrance 352 is always positioned within control cavity 336. Thus, plunger shoulder cavity 308 is in communication with the atmosphere and is used to dump the pressurized fluid through fluid passage 347, control cavity 336, rearward side entrance 352, central fluid passage 348, forward side entrance 351, dump cavity 349 and finally, dump port 337. As a result, the fluid force within plunger shoulder cavity 308 is removed while the fluid force within valve cavity 307 remains. Thus, pressurized fluid within valve cavity 307 pushes valve stem 340 to the right, as shown in FIG. 9, and opens valve outlet 314, allowing the pressurized fluid to enter outlet tube 311. Such valve opening action occurs instantaneously as the valve opening force provided by the pressurized fluid within valve cavity 307 is relatively high. Due to the fact that valve stem 340 has stem seal assemblies 326 and 341 which isolate both ends of valve stem 340 from the pressurized fluid, it is not difficult to provide sliding movement to valve stem 340. It is thus easier to maintain open the main valve outlet 314 with only hand forces. In fact, trigger lever 331 only has to overcome the force from compression spring 345, which has only relatively moderate bias strength and is primarily for the purpose of overcoming frictional forces from the seals acting against valve stem 340.

Figure 10:
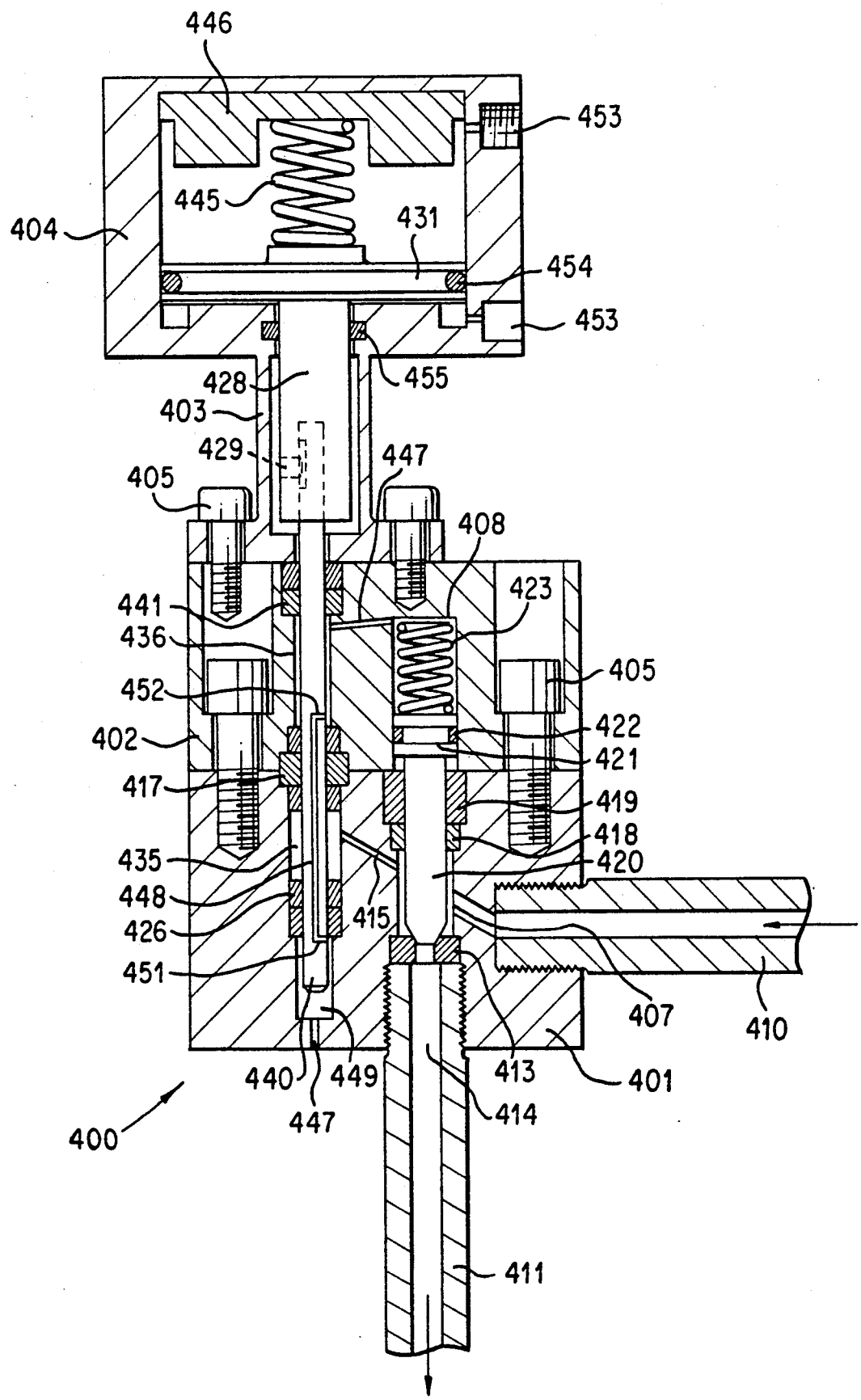
FIG. 10 is a partial cross-sectional side view of a dump valve having a powered actuator to operate the valve, according to yet another preferred embodiment of this invention.

Referring to FIG. 10, another preferred embodiment according to this invention is shown. Closure valve assembly 400 is attached to actuator 404 which provides the necessary push-pull force to move or operate valve stem 440. Closure valve assembly 400 comprises valve body 401, middle body 402, inlet tube 410, outlet tube 411, valve plunger 420 having plunger shoulder 421 and shoulder seal assembly 422, compression spring 423 positioned within plunger shoulder cavity 408, valve seat 413 having central outlet port 414, plunger seal assembly 418 and seal support 419. Valve stem 440 has central fluid passage 448 with forward side entrance 451 and rearward side entrance 452 and is in contact with seal assemblies 426, 417 and 441, which define dump cavity 449, supply cavity 435 and control cavity 436. Fluid passage 415 is in communication with main valve cavity 407 and supply cavity 435. Fluid passage 447 is in communication with control cavity 436 and plunger shoulder cavity 408. Adapter block 403 is secured to middle body 402. Valve actuator 404 is mounted to middle body 402 with anchor bolts 405, by threaded means, or by any other suitable method. Valve stem anchor 428 engages valve stem 440 with set screw 429 on one end and actuator piston 431 on the opposite end. Cushion spring 445 abuts actuator piston 431 on one end and disk bumper 446 on the opposite end. for the purpose of providing a pushing force which is required for a normally-open operating condition.

Fluid inlet 453 is used to admit compressed air or another compressed fluid for operating actuator 404. Actuator piston seal 454 forms a seal between actuator piston 431 and the cylinder wall. Stem anchor seal 455 is positioned within the body of actuator 404, around valve stem anchor 428. Actuator 404 can be operated with compressed air, compressed gas or hydraulic fluid, and can have a spring positioned on the top or bottom of actuator piston 431, depending upon the desired operation of the valve.

For a normally-closed operation of the valve, where central outlet port 414 is closed at all times until commanded to be open, actuator spring 445 is positioned below actuator piston 431, in order to provide a constant lifting force on actuator piston 431. Thus, high-pressure fluid within valve cavity 407 is routed through central fluid passage 448 of valve stem 440 to plunger shoulder cavity 408. Fluid inlet 453 of actuator 404 must be positioned on top of actuator 404 in order to provide fluid to the upper chamber of actuator piston 431 for valve-closure operations, wherein the working fluid enters actuator 404 under pressure and builds force to push actuator piston 431 downward, thereby moving valve stem 440 downward to expose forward side entrance 451 to the atmosphere and thus relieve pressure within plunger shoulder cavity 408, in order to open fluid outlet 414.

The normally-closed operating mode is most common in waterjetting operations. However, a normally-open operating mode is used in certain situations, such as instant shut-off waterjetting operations. With a normally-open operating mode, actuator 404 would have cushion spring 445 mounted on top of actuator piston 431 and working fluid would enter the actuator chamber below actuator piston 431, for providing a lifting force to actuator piston 431 and a closing force to valve plunger 420. It is apparent that a relatively small actuator 404 is required to operate closure valve assembly 400, even though the fluid pressure is relatively high and outlet port 414 is relatively large, since the required force can be provided by a handle lever arrangement, as previously discussed with respect to closure valve assemblies 200 and 300.

EXAMPLE I

A high-pressure, hand-operated dump valve assembly 100, according to one preferred embodiment as shown in FIG. 4, was constructed and assembled into a complete waterjet lance, equipped with an appropriate nozzle and tested in conjunction with a triplex crankshaft pump having a 60 horsepower (h.p.) power input. The external dimensions of such dump valve assembly 100 measured 2.5"×6.0"×1.25", and had a trigger lever of 6.0 inches long, measured from the nozzle assembly, and handle 104 of compatible length.

Valve body 101 and middle body 102 were constructed of stainless steel while adapter block 103 and handle 104 were constructed of aluminum alloy. Fluid inlet tube 110, fluid outlet tube 111 and dump tube 112 were constructed of stainless steel and each had an outside diameter of 0.563 inches and an internal bore of 0.188 inches. Trigger lever 131 was also constructed of stainless steel. Valve plunger 120, dump valve seat 113 and dump valve stem 125 were constructed of hardened stainless steel.

Valve plunger 120 was approximately 1.8 inches long, 0.312 inches in diameter in the front portion, and 0.438 inches in diameter at the shoulder. With such dimensions, the cross-sectional area of the 0.312 inch diameter portion was 0.077 in$^2$ and the cross-sectional area of the 0.438 inch diameter portion was 0.151 in$^2$, for an area ratio of about 1:2. Dump valve seat 113 had a port diameter of 0.189 inches and a slight taper at its upstream end to mate with the coned end of valve plunger 120. The diameter of the sealing circle between valve plunger 120 and valve seat 113 was estimated at 0.250 inches, thus corresponding to a cross-sectional area of 0.049 in$^2$, which is a smaller area than the cross-sectional area of valve plunger 120 within dump valve cavity 107. Thus, there was a net difference in cross-sectional area of 0.028 in$^2$ (0.077−0.049), that was subject to fluid actions within valve cavity 107, when dump port 114 was closed.

Central through hole 124 of valve plunger 120 had a diameter of about 0.063 inches, and was tapered slightly at the shoulder end to mate with a needle type valve stem 125. Valve stem 125 was about 1.20 inches long and 0.094 inches in diameter. Side fluid passage 115 within valve body 101 and fluid passage 116 within middle body 102 were each about 0.03 inches in diameter. Plunger shoulder cavity 108 was about 0.40 inches in diameter and about 0.85 inches deep. Compression spring 123 was constructed of stainless steel wire of 0.03 inches in diameter, and was approximately 0.7 inches long. Dump valve stem anchor 128 was also constructed of stainless steel and had a diameter of 0.312 inches in the front and 0.563 inches at the shoulder. Compression spring 130 was constructed of stainless steel wire 0.045 inches in diameter and about 0.80 inches in free length. The entire waterjet lance assembly was connected to a 60 h.p. crankshaft pump capable of delivering about 5 gallons per minute of water at a peak pressure of about 20,000 psi through a high-pressure hose. The waterjet lance had a nozzle assembly with an orifice of about 0.040 inches in diameter that complemented the output of the pump.

When the pump was initially started, water flowed out of both the nozzle and dump tube 112. The water pressure within valve cavity 107 was then estimated at not more than 500 psi.

Figure 1:
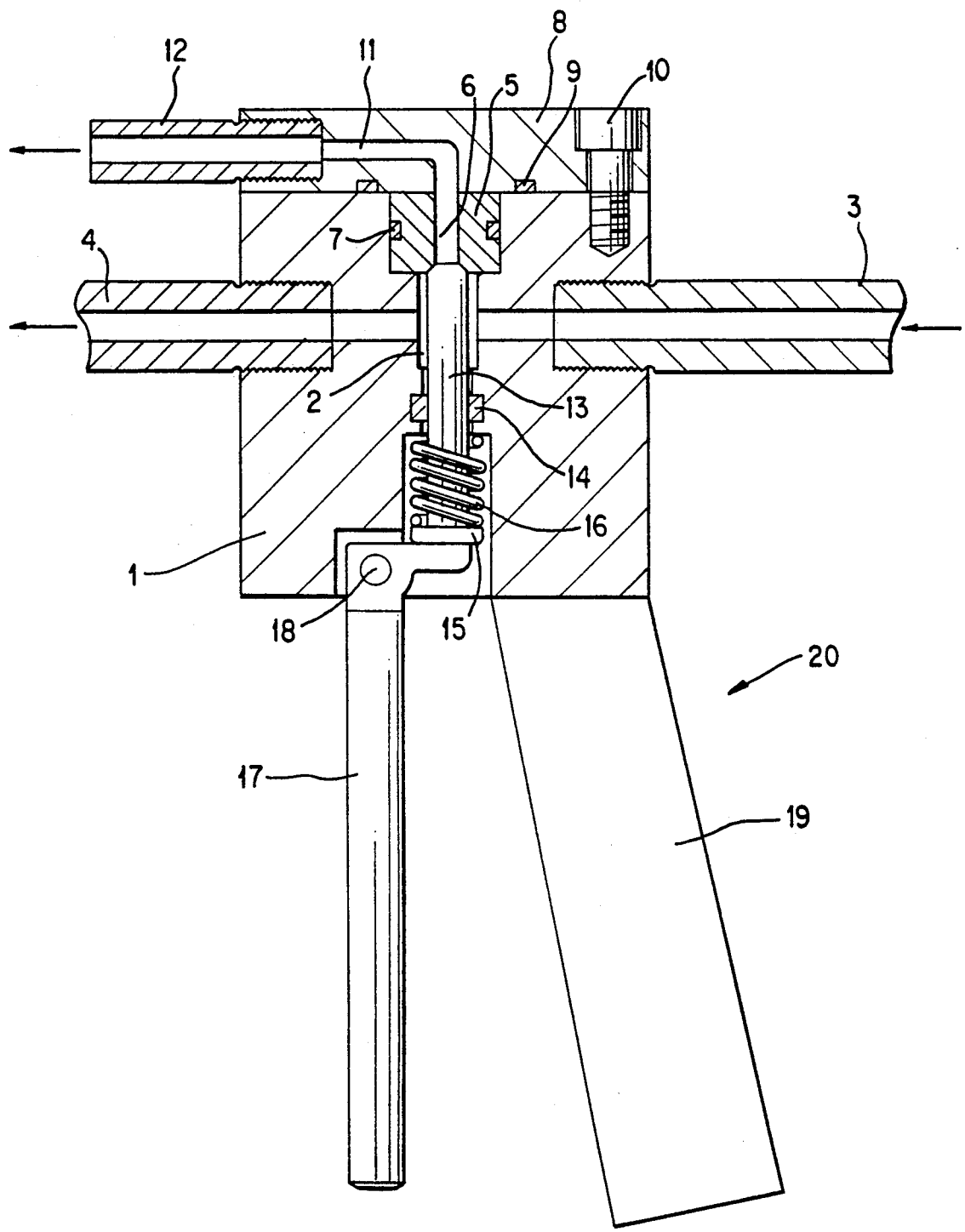
FIG. 1 is a partial cross-sectional side view of a conventional manually-operated dump valve, according to prior art, commonly found in waterjetting operations at static fluid pressures up to about 20,000 psi.
Figure 2:
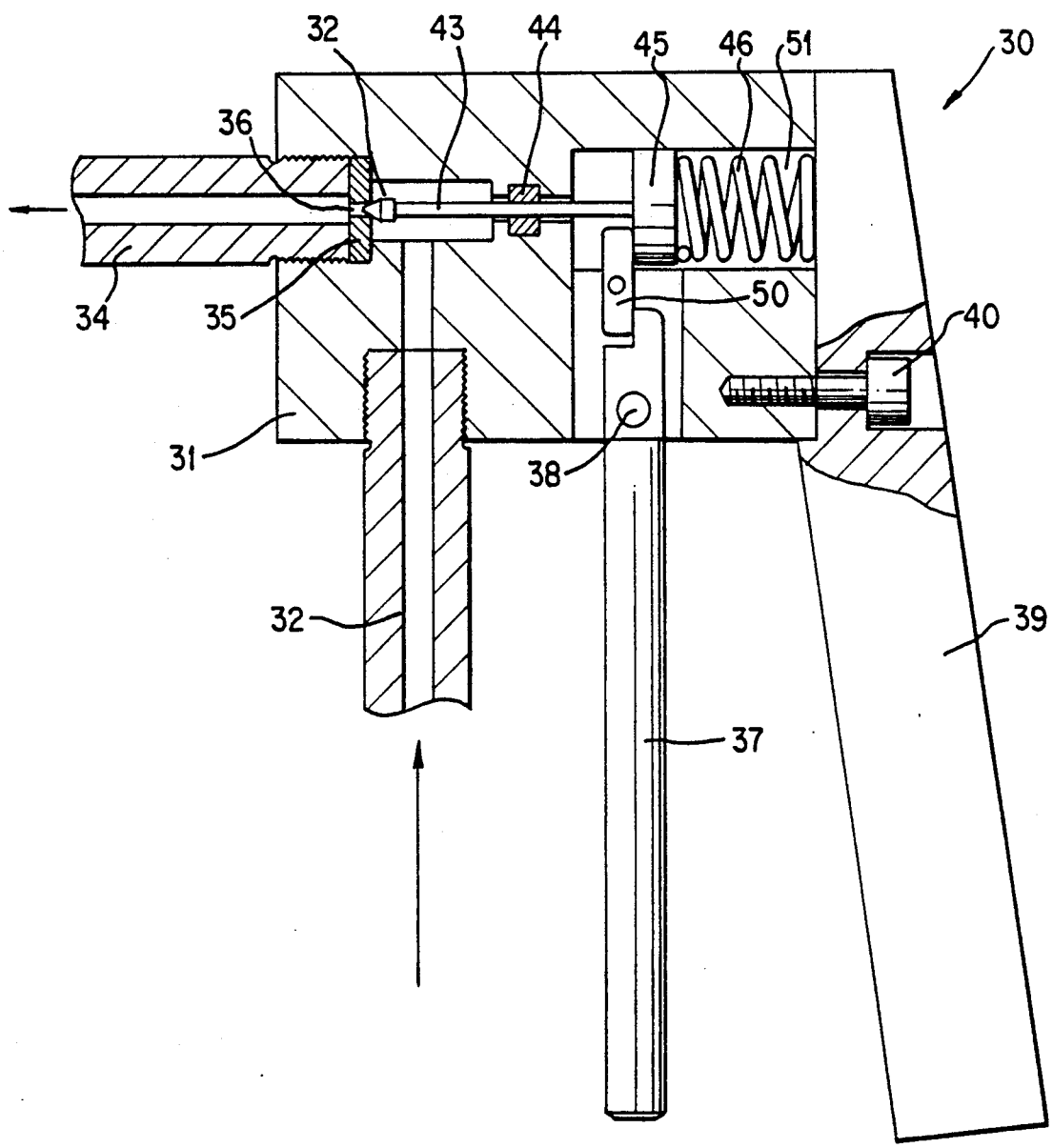
FIG. 2 is a partial cross-sectional side view of a conventional manually operated closure valve, according to prior art, commonly employed in waterjetting or other fluid spraying operations at static fluid pressures up to about 35,000 psi, wherein such valve is shown in a normally closed position.
Figure 3:
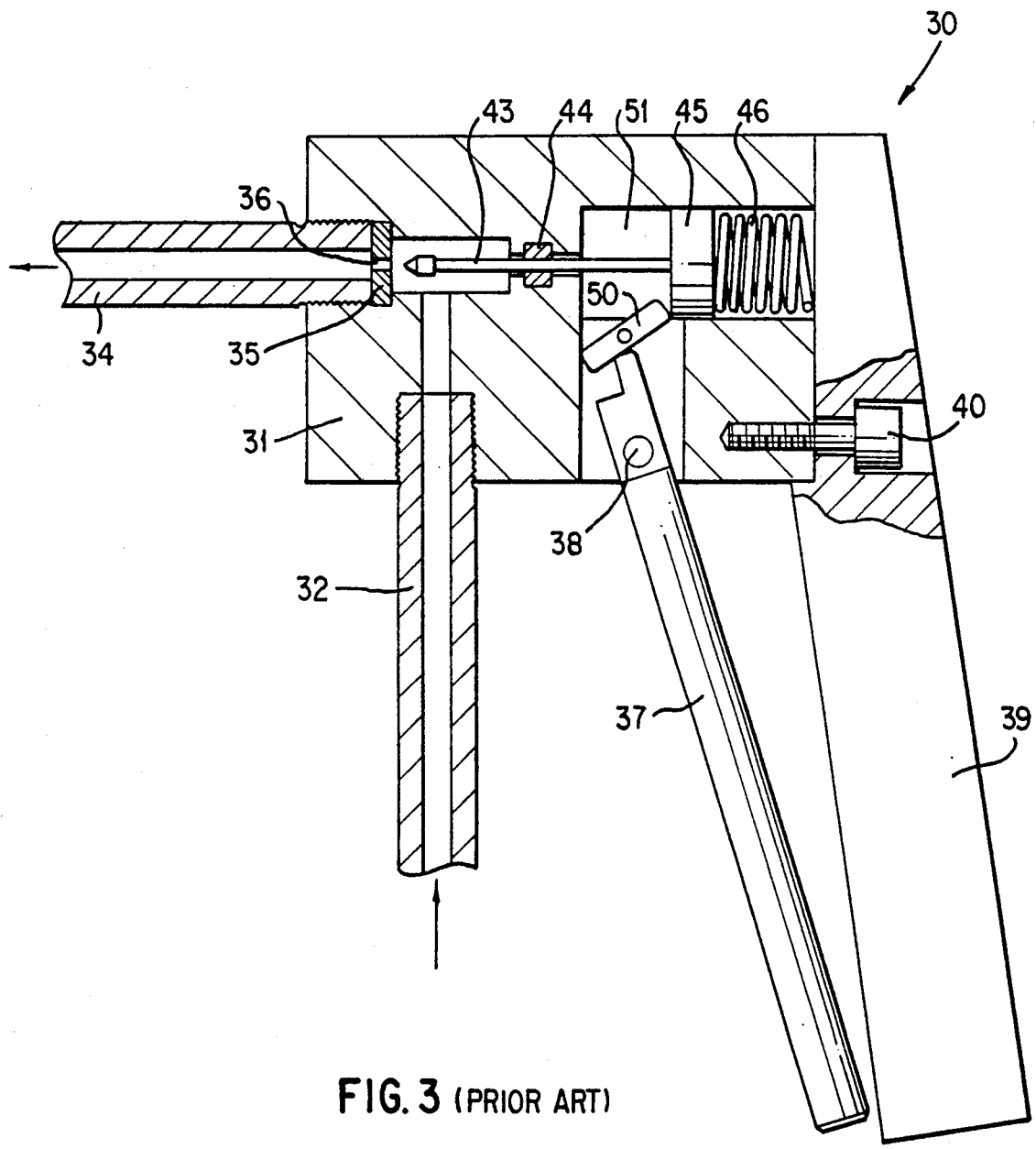
FIG. 3 is a partial cross-sectional side view of the conventional manually operated closure valve as shown in FIG. 2, but in an open and operating position.

Trigger lever 131 was pulled against handle 104, and instantly the water that was flowing through dump tube 112 stopped and the water pressure rapidly increased within dump valve assembly 100. The recoil force of the waterjet lance rapidly increased and thus a relatively high-velocity waterjet was generated at the nozzle. When a peak pressure of 20,000 psi was indicated by the pressure gauge, it was estimated that a force of 3,000 $lb_f$ (0.151 in$^2 \times$ 20,000 psi) was generated within plunger shoulder cavity 108, thereby forcing valve plunger 120 from right to left, as shown in FIG. 4. Concurrently, an estimated force of 560 $lb_f$ (0.028 in$^2 \times$ 20,000 psi) was generated within valve cavity 107, thus pushing valve plunger 120 from left to right, as shown in FIG. 4. Thus, there was an estimated net force of 2,440 $lb_f$ (3,000 $lb_f$–560 $lb_f$) exerted by the water enclosing dump port 114, not taking into account the forces contributed by trigger lever 131 and handle 104. The hand force required to closed through hole 124 of valve plunger 120 was relatively light, estimated at about 2 $lb_f$ corresponding to a force of 10 $lb_f$ exerted on dump valve stem 125. As trigger lever 131 was released, a small water stream was discharged from dump tube 112, followed quickly by the entire water flow from the pump. The waterjet lance quickly lost the recoil force as the waterjet at the nozzle decelerated. Pulling trigger 131 again resumed the pressure and waterjet operation. Such on-off operation was repeated successfully without any noticeable difference in hand forces. The closure of dump port 114 was found to be positive and leak-free which is directly contrary to a conventional dump valve, such as that shown in FIG. 1, that was made available for comparison during the testing.

EXAMPLE II

A high-pressure, hand-operated closure valve assembly 200, according to one preferred embodiment as shown in FIG. 6, was assembled into a complete waterjetting lance for testing. Closure valve assembly 200 had outside dimensions of about 2.5"×6"×1.25". Trigger lever 231 was 6 inches long, as measured from valve body 201. Handle 204 was also 6 inches long. Valve body 201, middle body 202, trigger lever 231, inlet tube 210, out let tube 211, supply valve stem anchor 243, dump valve stem anchor 228, seal supports 227 and 242, valve poppet 239 and springs 223, 230 and 245 were all constructed of stainless steel. Valve plunger 220, seal bushings 217 and 238, supply valve stem 240, dump valve stem 225 and valve seat 213 were all constructed of hardened stainless steel. Adapter block 203 and handle 204 were constructed of an aluminum alloy. All tie bolts 205, anchor bolts 206 and pivot pin 232 were constructed of stainless steel, for purposes of corrosion resistance.

Valve plunger 220 was about 1.6 inches long, 0.312 inches in diameter in the front portion and 0.438 inches in diameter at the shoulder. The ratio of the cross-sectional area of the plunger shoulder to the front portion was about 2:1. Outlet valve seat 213 had a central fluid passage of 0.189 inches in diameter and a slight taper on its upstream side to mate with a coned end of valve plunger 220. The diameter of the sealing circle between valve seat 213 and valve plunger 220 was about 0.250 inches, thus corresponding to a cross-sectional area of 0.049 in$^2$, which is smaller than the cross-sectional area of valve plunger 120. Thus, the net difference in the cross-sectional areas was 0.028 in$^2$ (0.077 in$^2$–0.049 in$^2$), which was subjected to fluid force actions within valve cavity 207. Side passage 215 and fluid passage 237 within valve body 201 were about 0.032 inches in diameter. The fluid passages of seal bushings 217 and 238 were also about 0.032 inches in diameter.

Valve poppet 239 was about 0.600 inches long, 0.100 inches in diameter, had a needle-type tip facing toward seal bushing 217, and was housed within cylindrical supply valve cavity 235 of about 0.125 inches in diameter. Supply valve stem 240 was about 1.0 inch long and 0.063 inches in diameter, thus corresponding to a cross-sectional area of about 0.0031 in$^2$. Supply valve stem 240 had blunt ends. Dump valve stem 225 was about 2.30 inches long, 0.094 inches in diameter, had a needle-type tip on one end and a blunt end on the opposite end, and was housed within cylindrical dump valve cavity 236 of about 0.125 inches in diameter. Fluid passages 247 and 248 within middle body 202 were about 0.032 inches in diameter, and were in communication between supply valve cavity 235, plunger shoulder cavity 208 and fluid passage 248. Springs 245 and 230 had similar outside diameters of about 0.560 inches and similar free lengths of about 0.88 inches, and were constructed of stainless steel wire having a diameter of 0.060 inches. Spring 223 was 0.40 inches in outside diameter, 0.75 inches in free length and was constructed of stainless steel wire having a diameter of 0.055 inches. As shown in FIG. 6, the needle-type end of dump valve stem 225 was positioned to face seal bushing 238 while the blunt end was within cylindrical stem anchor 228 and fastened with set screw 229.

The waterjet lance assembly comprising closure valve assembly 200 was connected to a 50 h.p. fluid pressure intensifier, through a high-pressure hose. The intensifier was capable of delivering about 1.6 gallons per minute of water at a peak pressure of about 45,000 psi. However, it was set to deliver about 1.0 gallons per minute of water at a pressure of 30,000 psi to the waterjet lance assembly.

Closure valve assembly 200 was closed at the time when the 30,000 psi water was introduced. Trigger lever 231 was at a position illustrated by dashed line 234, as shown in FIG. 6. At such point, an estimated force of 4,540 $lb_f$ (0.151 in$^2 \times$ 30,000 psi) was pushing plunger shoulder 221 against valve seat 213, while a water force of 840 $lb_f$ (0.028 in$^2 \times$ 30,000 psi) was forcing valve plunger 220 away from valve seat 213. Thus, the net seating force of valve plunger 220 enclosing outlet port 214 was estimated at 3,700 $lb_f$ (4,540 $lb_f$–840 $lb_f$), when the 30,000 psi water was introduced into closure valve assembly 200. Thus, it was no surprise that no leakage occurred at the nozzle.

To open outlet port 214, trigger lever 231 was pulled toward handle 204. A hand force estimated at about 18 $lb_f$ was needed to pull trigger lever 231 to a vertical position, as shown in FIG. 6. A slight increase in the hand force moved trigger lever 231 to the position represented by dashed line 250, as shown in FIG. 6, closer to handle 204. Immediately, a bang noise and vibration occurred within closure valve assembly 200, and a high-velocity waterjet was generated at the nozzle. Simultaneously, the force against the hand was significantly reduced. It was estimated that the hand force required to keep closure valve assembly 200 open was about 5 lb$_f$. The reason for the reduction was due to the fact that fluid passage 251 of seal bushing 217 was blocked by valve poppet 239. Fluid passage 251, which was relatively small, required only a relatively moderate force to block the 30,000 psi water, which was supplied by the hand force through trigger lever 231, stem anchor 244, valve stem 240, all to valve poppet 239.

It is apparent that other possible embodiments of closure valve assembly 200 exist, through which high-pressure fluid is routed to plunger shoulder cavity 208, or the rear portion of valve plunger 220. To close the valve assembly, the hand forces on trigger lever 231 were released and immediately trigger lever 231 returned to the original at rest position, represented by dashed line 234, as shown in FIG. 6, and the waterjet at the nozzle stopped flowing, indicating a complete and sealed closure of outlet port 214. Closure of outlet port 214 was the result of a chain of mechanical events which occurred after the hand force was released from trigger lever 231. First, compression spring 230 pushed dump valve stem 225 from right to left, as shown in FIG. 6, thus closing fluid passage 252. Concurrently, high-pressure water passed through supply fluid passage 251 and fluid passage 247, entered into plunger shoulder cavity 208 and thus built up pressure within plunger shoulder cavity 208. Due to its relatively small volume, plunger shoulder cavity 208 was quickly filled and the fluid exerted a full force of about 4,540 lb$_f$ against plunger shoulder 221. Simultaneously, water within valve cavity 207 exerted a force of about 2,290 lb$_f$(0.076 in$^2$ × 30,000 psi) against the front face of valve plunger 221. Thus, there was a net force of 2,250 lb$_f$ (4,540 lb$_f$−2,290 lb$_f$) in favor of closing outlet port 214. Such force of 2,250 lb$_f$ is much higher than conventional compression springs or hand lever actions can provide. As a result, outlet port 214 was quickly closed into a tight and sealed position without much mechanical bang as the force differential was "gently" increased. To repeat the cycle, trigger lever 231 was again pulled toward handle 204.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A dump valve assembly comprising:
  a valve body, a middle body, an adapter block, an inlet tube, an outlet tube, a dump tube, said valve body having a valve cavity in communication with said inlet tube, said outlet tube and said dump tube, said middle body secured to said valve body, said adapter block secured to said middle body;
  at least one of said valve body and said middle body forming a plunger shoulder cavity, said plunger shoulder cavity in communication with said valve cavity;
  a dump valve seat mounted within said valve body, said dump valve seat having a valve seat through hole in communication with said dump tube and said valve cavity, a valve plunger mounted within said plunger shoulder cavity and said valve cavity; said valve plunger having a downstream plunger end, downstream with respect to discharge fluid flow through said dump tube, sealably mateable with said dump valve seat; said valve plunger having a through hole in communication with said plunger shoulder cavity and said dump tube, said valve plunger forming a plunger shoulder;
  plunger bias means for urging said valve plunger into a normally unseated position, with respect to said dump valve seat; a dump valve stem mounted within at least one of said middle body and said adapter block; and
  stem displacement means for axially moving a downstream stem end of said dump valve stem into and out of a seated position within said plunger through hole.

2. A dump valve assembly according to claim 1 further comprising a plunger seal assembly and a plunger seal support adjacently mounted within said valve body, and said valve plunger mounted to sealably extend through said plunger seal assembly and said plunger seal support.

3. A dump valve assembly according to claim 2 wherein said plunger bias means further comprises a compression spring mounted around said valve plunger between said seal support and said plunger shoulder.

4. A dump valve assembly according to claim 1 further comprising a shoulder seal assembly mounted between said plunger shoulder and a plunger shoulder cavity wall, which defines said plunger shoulder cavity, for forming a seal.

5. A dump valve assembly according to claim 1 wherein said fluid passage is formed within both said valve body and said middle body, a seal assembly is mounted between said valve body and said middle body, and said seal assembly has an assembly through hole in communication with said fluid passage.

6. A dump valve assembly according to claim 1 wherein said valve body, said middle body and said adapter block are secured together with a plurality of bolts.

7. A dump valve assembly according to claim 1 further comprising a stem seal assembly and a stem seal support adjacently mounted within said middle body.

8. A dump valve assembly according to claim 1 including handle means comprising said adapter block having a dump spring cavity, a stem anchor with a stem anchor shoulder mounted within said dump spring cavity, an upstream stem end of said dump valve stem secured within a well of said stem anchor, an elongated trigger lever pivotally mounted within said adapter block whereby an internal end portion of said trigger lever engages with said stem anchor shoulder, and anchor bias means for urging said downstream stem end into an unseated position within said through hole of said valve plunger and for urging said trigger lever into a cocked position.

9. A dump valve assembly according to claim 8 wherein said anchor bias means further comprise an anchor compression spring mounted around said stem anchor between said stem anchor shoulder and a shoulder of a stem seal support mounted within said middle body.

10. A dump valve assembly according to claim 8 wherein said stem displacement means further comprise an elongated handle secured to said adapter block within a hand gripping distance of said trigger lever.

11. A dump valve assembly according to claim 1 wherein said plunger shoulder divides said plunger shoulder cavity into an air chamber and a pressure chamber, said pressure chamber is in communication with said fluid passage, and said air chamber is in communication with an ambient atmosphere surrounding the dump valve assembly.

12. A dump valve assembly according to claim 11 wherein said valve body is secured to said middle body so as to form a gap through which said air chamber communicates with said ambient atmosphere.

13. A dump valve assembly according to claim 1 wherein said middle body forms a fluid passage which forms the communication between said plunger shoulder cavity and said control cavity.

* * * * *